United States Patent [19]

Ettman

[11] Patent Number: 4,472,134
[45] Date of Patent: Sep. 18, 1984

[54] VAPORIZING FUEL OIL BURNER

[75] Inventor: Spencer E. J. Ettman, Pittstown, N.J.

[73] Assignee: Electro Vapor Energy Corp., Plainfield, N.J.

[21] Appl. No.: 318,371

[22] Filed: Nov. 5, 1981

Related U.S. Application Data

[63] Continuation-in-part of Ser. No. 121,827, Feb. 15, 1980, abandoned.

[51] Int. Cl.³ .............................................. F23D 11/44
[52] U.S. Cl. ...................... 431/41; 431/207; 431/208; 239/136; 239/590.3
[58] Field of Search ................. 431/208, 207, 264, 36, 431/209, 41; 210/299, 435, 532.1; 239/590.3, 136

[56] References Cited

U.S. PATENT DOCUMENTS

| 852,584 | 5/1907 | Skinner | 210/435 |
| 1,494,649 | 4/1923 | Trask | 431/208 |
| 1,687,148 | 10/1928 | Schneider | 431/208 |
| 2,580,012 | 12/1951 | Gazda | 210/532.1 X |
| 3,223,331 | 12/1965 | Baker | 239/590.3 |

FOREIGN PATENT DOCUMENTS

| 234255 | 6/1964 | Austria | 431/208 |
| 2306840 | 8/1974 | Fed. Rep. of Germany | 431/208 |
| 976747 | 3/1951 | France | 431/208 |

Primary Examiner—Samuel Scott
Assistant Examiner—Allen J. Flanigan
Attorney, Agent, or Firm—McAulay, Fields, Fisher, Goldstein & Nissen

[57] ABSTRACT

An atomizer injects fuel oil into one end of a heated tube. As the atomized fuel travels down the tube, it is vaporized. A nozzle at the other end of the tube assures that pressure is built up in the tube so that fuel oil vapor is applied as a steady continuous stream from the nozzle directly into a combustion chamber where it is mixed with ambient air and burned. Ambient air is drawn into the combustion chamber through a vent and a blower is not used. A secondary tube is in communication with the main tube through a bore in the side wall of the main heating tube near the outlet nozzle. A screen at the outlet nozzle prevents particles from clogging the nozzle. These particles fall into the secondary tube to be collected in a sump at the end of the secondary tube. Electric current is passed through the walls of the main heating tube and the secondary tube to generate heat to vaporize the fuel and to provide a temperature gradient along the main heating tube such that a maximum temperature of above 400° C. is maintained sufficiently close to the outlet nozzle to prevent temperature at the outlet nozzle from dropping to a point where significant condensation occurs.

7 Claims, 3 Drawing Figures

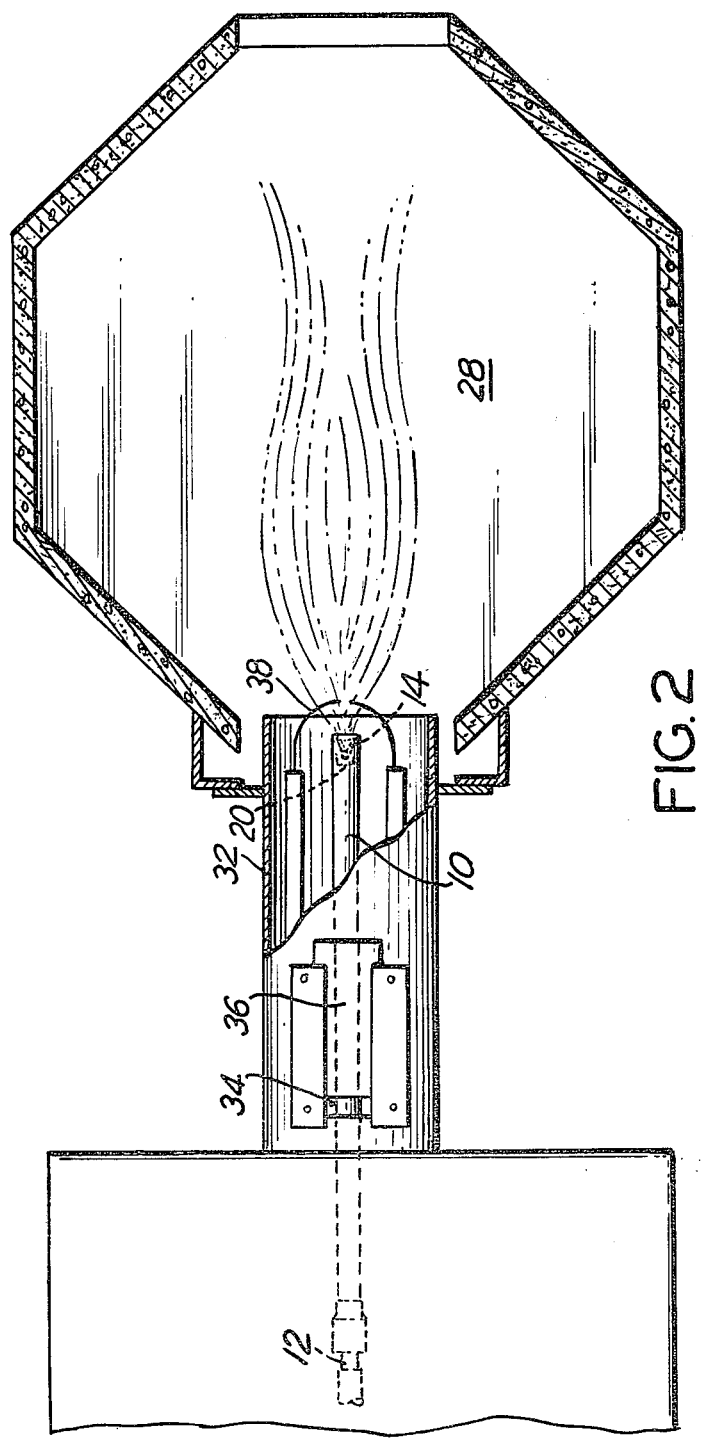
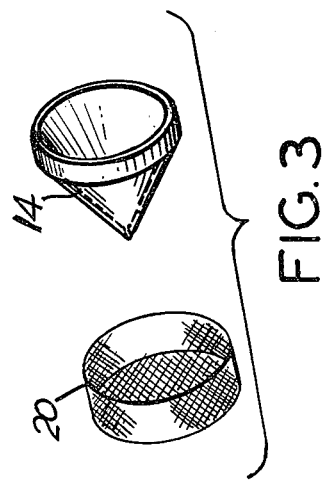
FIG. 2
FIG. 3

VAPORIZING FUEL OIL BURNER

REFERENCE TO RELATED APPLICATION

This application is a continuation-in-part of Ser. No. 121,827 filed on Feb. 15, 1980 and entitled Electro-Vapor Oil Burner, now abandoned.

BACKGROUND

This invention relates to oil burners and more particularly to one which provides an intimate mixing of fuel and air to enhance operating efficiency.

In the operation of oil burners, including the relatively compact units used for home heating, there has been a problem of breaking the oil into particles fine enough to enable efficient combustion with acceptably low generation of soot and noxious exhaust gases, such as carbon monoxide and nitrogen oxide.

The prior art has recognized the value of vaporizing a normally liquid fuel oil to obtain increased fuel combustion efficiency and reduced production of soot and exhaust gases. However the techniques taught to achieve such results are complex, expensive, require excessive heat to vaporize the fuel oil and/or are not responsive to control to provide a range of heating levels.

An additional factor in fuel heating efficiency is the loss of heat up the stack. In order to provide an adequate mixture of air and atomized fuel oil to maximize the burning of the fuel oil, air has to be blown into the combustion chamber. The air has to be provided in a substantial excess quantity, the rule of the thumb being 20% over stoichiometric. As a consequence, the hot gases of combustion have relatively low residence time in the combustion chamber and are emitted up the stack with a temperature where an appreciable amount of heat could still be transferred to and through the heat exchanger.

Although a large number of proposals have been made to provide more complete combustion, reduced pollution and increased heat transfer from the combustion chamber to the heating fluid, the achievement of one of these objectives tends to result in a loss of the other objective.

Accordingly, it is a major purpose of this invention to provide an optimized trade-off between the seemingly conflicting objects of complete combustion, minimum pollution and maximum heat transfer.

It is a further object of this invention to provide this optimum trade-off and optimum combination of results in a device which is relatively inexpensive to manufacture, simple to maintain and substantially immune to the varied environments within which it must operate.

For an improved fuel oil burner to be employed in a large number of homes and factories, it must operate substantially trouble free and must be able to withstand a range of ambient conditions particularly with respect to temperature, dirt and other pollutants that may exist in the wide variety of environments where such a device is likely to be used.

It is also important that the optimized trade-off between the achievement of these various objectives and the optimized enhancement of each of these objectives be maintained over long periods of time throughout a range of environmental conditions. After all, if there is any rapid degradation in performance in varying environments or if delicate adjustments have to be maintained, it is unlikely that the improvement objectives will be attained as a practical matter in field use.

BRIEF DESCRIPTION

In brief, one embodiment of this invention employs a heated tube having an inlet into which an atomizer sprays droplets of fuel oil. As the fuel oil travels down the tube, it is heated and substantially vaporizes. At the outlet end of the tube, a nozzle controls the ejection of vaporized fuel into a combustion chamber. The nozzle at the outlet end of the tube assures that sufficient vapor pressure is developed within the tube to provide a desired and controlled flow of fluid through the nozzle into a combustion chamber. The upstream end of the nozzle is covered by a screen having openings sufficiently less in dimension than the diameter of the nozzle aperture so that large particles, usually of impurities, are prevented from clogging the nozzle.

Adjacent to the screen and off the side of the heating tube is a secondary tube that leads to a sump where the particles from the screen are deposited and collected. The secondary tube is also heated in order to assure that the temperature gradient in the main heating tube is such that the maximum temperature is close to the outlet end of the main heating tube. It is desirable to have the maximum temperature to which the fuel oil is subjected in the tube at no more than 400° C. to prevent breakdown of the fuel oil. At the same time, it is desirable that the temperature of the fuel oil at the output nozzle be at least 375° C. to minimize condensation prior to combustion. By having the hottest zone along the heating tube close to the outlet end of the heating tube, this result is achieved.

The heating tube is heated by passing a current through the wall of the tube from the input end of the heating tube, along the main heating tube and then along the secondary tube to an outlet attached to the sump.

A housing surrounds the heating tube and extends into the combustion chamber. An opening in this housing permits air to enter the combustion chamber and mix with the fuel. In the combustion chamber, the fuel-air mixture is ignited. Because the air is not blown into the combustion chamber, the dwell time of the hot products of combustion in the combustion chamber is substantially increased over what otherwise would be the case and the amount of heat transferred to the heat exchanger is maximized. In addition, because of the intimate mixture of the air and fuel vapor, complete combustion is achieved with the result that there is not only maximum use of the fuel oil to produce heat but also a minimum production of pollutants.

BRIEF DESCRIPTION OF THE FIGURES

FIG. 1 includes an electrical schematic showing the connections for controlling the heating of the heating tube as a function of temperature sensed in the tube.

FIG. 2 is a plan view in partial section of the FIG. 1 device showing the air inlet and its relation to the outlet portion of the heating tube and combustion chamber.

FIG. 3 is a perspective exploded view of the conical outlet nozzle at the outlet end of the heating tube and of the screen adjacent the nozzle. The scale of FIG. 3 is much greater than that of FIGS. 1 and 2.

DESCRIPTION OF THE PREFERRED EMBODIMENTS

Figure 1:
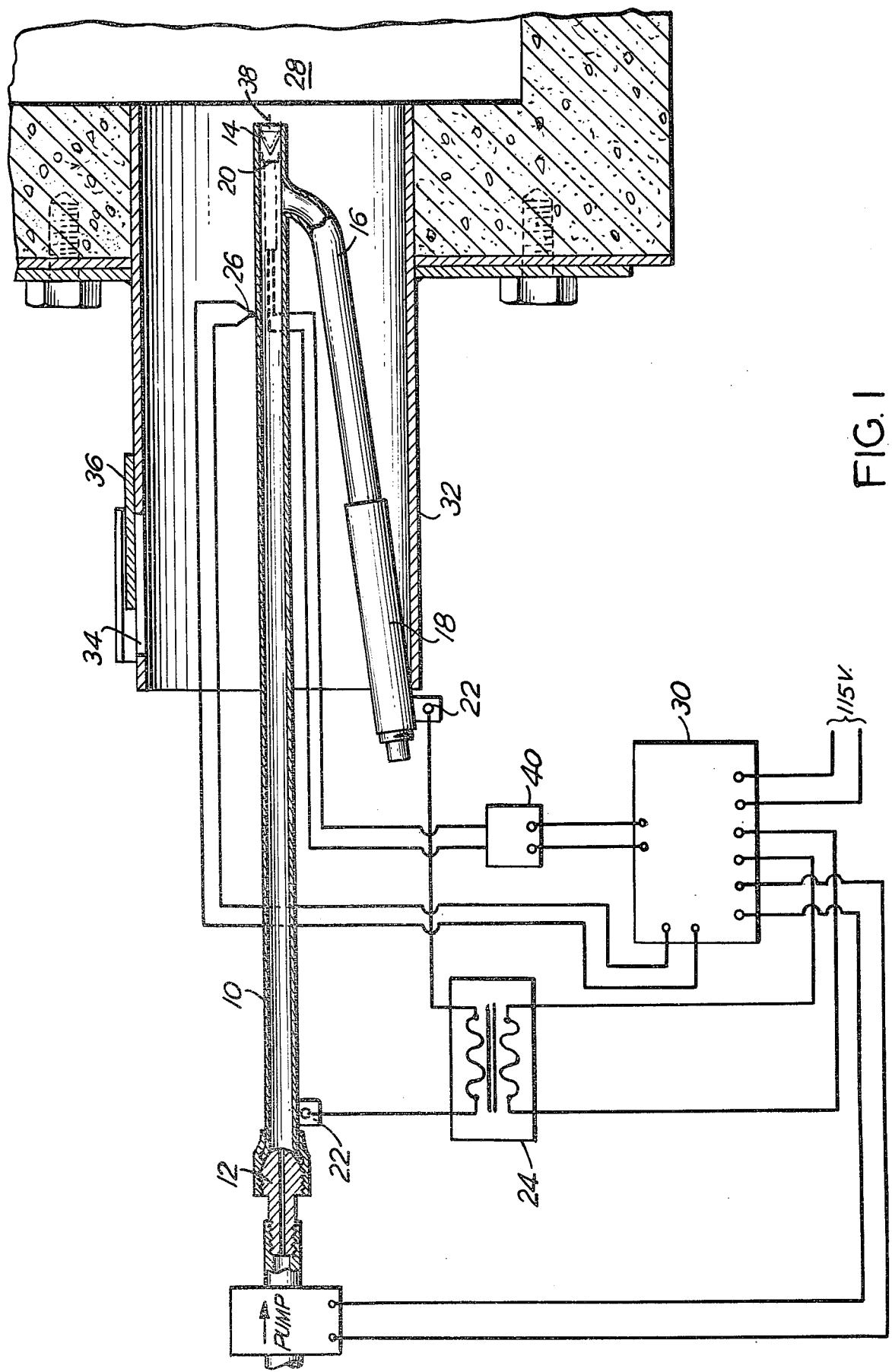
FIG. 1 is a longitudinal cross-sectional view through the device of this invention showing the heating tube, outlet nozzle, air inlet and relationship to the combustion chamber.

All of the figures relate to the same embodiment. As shown in the FIGS., a heating tube 10 provides a passageway for fuel oil which is introduced in atomized form at the inlet end of the heating tube through an atomizer 12. The atomized fuel is heated and vaporized as it passes along the heating tube 10 to a nozzle 14 at the outlet end of the tube 10. A secondary tube 16 is in communication with the downstream or outlet end of the heating tube 10 through a sidewall opening and provides a passageway for impurities to a sump 18. A screen 20 is deployed across the interior diameter of the heating tube 10 immediately upstream from the nozzle 14 to screen out impurities and to prevent the nozzle 14 from partially or totally clogging. The flow of gas is sufficiently turbulent, particularly adjacent the screen 20, so that particles trapped by the screen 20 are blown loose and drop into the opening of the secondary tube 16 to pass down to the sump 18.

The outlet nozzle 14 is a conical structure having its apex pointing into the heating tube 10 and its aperture extending axially through its apex. It is believed that this structure reduces the chance that any particles which get through the screen 20 will impinge on the nozzle 14 aperture. This tends to assure an even, axial flow of fuel through the nozzle 14 as this further reduces the chance of even partially clogging the nozzle 14.

In one embodiment that has been tested the heating tube 10 is about 30 cm (12 inches) long, has an outside diameter of 9.5 mm (⅜ inch) and a wall thickness of 0.75 mm (30 mils). The secondary tube 16 has a length of 10 cm (4 inches) and otherwise has the same outside diameter and wall thickness as does the main heating tube 10. However the sump 18 has a wall thickness of 3.2 mm (125 mils) so that the electric current, which heats the tube 10 and flows through the walls of these tubes, 10, 16, 18 does not develop significant heat in the walls of sump 18. In that embodiment, the atomizer 12 has a aperture of 0.13 mm (5 mils) while the nozzle 14 has an aperture of 1.0 m (40 mils). The screen 20 is a mesh having openings of 0.5 mm (20 mils) so that any particles incident on the nozzle 14 will have a maximum dimension substantially less than the diameter of the aperture of the nozzle 14 and thus will pass through the nozzle 14.

Electric terminals 22 in electrical contact with the metal conductive walls of the stainless steel heating tube 10 and sump 18 are connected to the secondary of transformer 24 to provide a source of current that flows along the wall of the heating tube 10, secondary tube 16 and sump 18. Because of the resistance provided by the walls of the heating tube 10 and secondary tube 16, the resistive losses ($I^2R$) serve to generate heat which maintains the interior of the heating tube 10 hot enough to vaporize the atomized fuel.

It is important that this heating be controlled to avoid temperatures substantially in excess of 400° C. because hotter temperatures will tend to cause the fuel oil to break down resulting in carbonization, and the consequent deterioration of the system. Furthermore, it is desirable to keep the temperature of the vapor adjacent to the nozzle 14 at approximately 375° C. or preferably somewhat greater, to minimize condensation of the vapor as it comes through the nozzle 14. Although a small amount of condensation into the combustion chamber 28 would probably not have a significant adverse effect, it is desirable to keep the amount of such condensation at a minimum so that as complete a combustion of the fuel as is possible occurs in the combustion chamber 28. Accordingly, a thermocouple 26 is positioned along the wall of the heating tube 10 at the zone of expected maximum temperature. The output of this thermocouple 26 is fed to a control unit 30 to control the voltage applied to the primary of the transformer 24 so as to maintain the temperature at this hottest zone at some predetermined magnitude close to but under 400° C. Under normal operating conditions, a current of about 450 amperes at a voltage of between two and three volts is impressed across the terminals 22.

The temperature gradient along the heating tube 10 increases from the inlet end where relatively cool atomized fuel is introduced to the zone adjacent the thermocouple 26. The temperature downstream from the thermocouple 26 cools off slightly because of the relatively greater mass and exposure near the nozzle end of the heating tube 10. In the 30 cm heating tube 10 embodiment mentioned above, the thermocouple is six cm. from the outlet end of the tube 10. The secondary heating tube 16 is important to assure that the temperature at the nozzle 14 does not drop to a point where condensation occurs. The tube 16 modifies the temperature gradient along the main tube 10 by moving the zone of maximum temperature downstream.

The heating tube 10 is surrounded by a housing 32 which extends up to the nozzle portion of the heating tube 10 and provides a means for mounting the heating tube 10 at the inlet to the combustion chamber 28. More importantly, an opening 34 along the top surface of the housing 32 provides a passage for ambient air into the combustion chamber 28. As shown in FIG. 2, an adjustable shutter 36 permits adjusting the opening 34 to match the capacity of the burner. It is contemplated that this opening 34 will be a fixed opening in a given installation.

Ignition electrodes 38 provide a spark for igniting the fuel when the burner is turned on. A 10 KV spark may be employed, as is known in this art, and thus requires a transformer 40 to obtain such a voltage from a line source. In operation once ignition has been achieved, the burning of the fuel will result in exhaustion of the hot gases of combustion up a stack (not shown) as is known in this art. As a consequence, air will be pulled through the opening 34 on a continuing basis and, in the embodiment tested, this air is provided at ambient pressure without the requirement for a blower. As a consequence the residence time of the hot products of combustion in the combustion chamber 28 is enhanced over what would be the case if an air blower were used and the result is that a greater proportion of heat from the hot products of combustion is transferred to the heat exchanger in the combustion chamber.

In one experimental embodiment, a stack measurement of carbon dioxide of 14.5% was obtained and a stack temperature of 65° C. (150° F.) was measured. As is known in the art, these measurements respectively indicate that a high percentage of the fuel was burned and that a relatively large portion of the heat in the products of combustion was transferred to the heat exchanger within the combustion chamber. In this fashion, improved efficiency is obtained by maximizing the combustion of the fuel and maximizing the heat transfer from the fuel. As a consequence, the amount of undesired products of combustion such as carbon monoxide and nitrogen oxide are reduced from what would otherwise be the case. Further some preliminary tests suggest that the above device when compared with a prior art retention head burner will achieve the same heating result with about a 33% fuel saving and when compared with an open ended burner will provide the same heating results with approximately 40% fuel savings. It is believed that optimizing the design of a burner in terms of the combustion chamber and boiler involved could provide even further savings. These tests were made as a standardized procedure under which comparisons were made in raising the temperature of a predetermined quanity of water by 100° F. Thus field tests may not reflect these test results.

What I claim is:

1. A fuel oil burner comprising:
   a main heating tube for heating and vaporizing fuel oil passed from an inlet end of said tube to an outlet end of said tube,
   an input flow restrictor at said inlet end of said heating tube to provide a controlled flow of fuel oil into said heating tube,
   an outlet nozzle at said outlet end of said heating tube to provide a controlled flow of vaporized fuel out of said heating tube and to develop pressure in said tube,
   heating means for heating said main tube,
   a screen across the upstream end of said outlet nozzle, the apertures of said screen being smaller than the aperture of said nozzle to prevent particles that might clog said nozzle from reaching said nozzle,
   sump means in communication with the upstream side of said outlet nozzle to receive and contain particles stopped by said screen, and
   a secondary heating tube having an inlet end in communication with said main heating tube, said inlet end of said secondary heating tube being positioned upstream and adjacent to said outlet nozzle, said secondary heating tube extending between said first heating tube and said sump, said secondary heating tube being heated by said heating means to maintain the outlet end of said main heating tube at a temperature sufficient to vaporize the fuel oil issuing from said outlet end.

2. The fuel oil burner of claim 1, further comprising:
   a housing around at least the downstream portion of said heating tube, said housing being adapted to be mounted to an opening in a combustion chamber and, when so mounted, said outlet nozzle being positioned to provide vaporized fuel directly into said combustion chamber,
   said housing having a peripheral opening to admit air for passage into said combustion chamber and for mixture with vaporized fuel from said nozzle within said combustion chamber.

3. The fuel oil burner of claim 2 wherein said peripheral opening provides direct communication with the ambient atmosphere and is the sole substantial source of air for mixture and burning with the fuel oil.

4. The fuel oil burner of claims 1 or 2 further comprising:
   temperature control means responsive to the temperature at at least one position along said main heating tube to control the power applied by said heating means and thus control the temperature in said main heating tube.

5. The fuel oil burner of claim 4 wherein: said temperature control means includes a thermocouple at a predetermined position along said heating tube at the zone of expected maximum temperature and a power controller responsive to the output of said thermocouple.

6. The fuel oil burner of claims 1 or 2 wherein: said heating means heats said main tube to maintain the hottest zone of said heating tube at a temperature no greater than substantially 400° C. and the temperature within said main tube adjacent to said outlet nozzle as substantially no less than 375° C.

7. The fuel oil burner of claims 1 or 2 wherein said heating means is a source of an electric current applied along the wall of said main heating tube, heat being generated along substantially the entire wall of said main heating tube by resistive losses from the flow of current between upstream and downstream portions of said main heating tube.

* * * * *